(12) United States Patent
Takagi et al.

(10) Patent No.: US 9,275,318 B2
(45) Date of Patent: Mar. 1, 2016

(54) IMAGE FORMING SYSTEM FOR PARTIALLY GENERATING IMAGES AS LOG IMAGE

(71) Applicant: Kyocera Document Solutions Inc., Osaka (JP)

(72) Inventors: Jumpei Takagi, Osaka (JP); Keiji Okamura, Osaka (JP); Toru Yasui, Osaka (JP); Ryota Arinobu, Osaka (JP); Rie Matsumoto, Osaka (JP); Masaki Kikuchi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/287,233

(22) Filed: May 27, 2014

(65) Prior Publication Data

US 2014/0347691 A1    Nov. 27, 2014

(30) Foreign Application Priority Data

May 27, 2013    (JP) .................... 2013-111394

(51) Int. Cl.
 *G06F 3/12*    (2006.01)
 *G06K 15/00*   (2006.01)
 *G06K 15/02*   (2006.01)

(52) U.S. Cl.
 CPC ............ *G06K 15/40* (2013.01); *G06K 15/1886* (2013.01)

(58) Field of Classification Search
 USPC ................................................ 358/1.15, 1.13
 See application file for complete search history.

(56) References Cited

U.S. PATENT DOCUMENTS

| 2005/0144469 A1* | 6/2005 | Saitoh ........................... 713/189 |
| 2006/0290975 A1* | 12/2006 | Murakami et al. ........... 358/1.15 |
| 2007/0133037 A1* | 6/2007 | Arai et al. .................... 358/1.14 |
| 2007/0211288 A1* | 9/2007 | Uejo et al. .................... 358/1.16 |
| 2009/0009800 A1* | 1/2009 | Jung ............................ 358/1.15 |
| 2010/0110484 A1* | 5/2010 | Hikosaka ..................... 358/1.15 |
| 2011/0032563 A1* | 2/2011 | Matsuzawa .................. 358/1.15 |

FOREIGN PATENT DOCUMENTS

| JP | 2007-006036 A | 1/2007 |
| JP | 2007-166177 A | 6/2007 |
| JP | 2007-279817 A | 10/2007 |
| JP | 2008-152402 A | 7/2008 |
| JP | 2012-083844 A | 4/2012 |

* cited by examiner

*Primary Examiner* — Martin Mushambo
(74) *Attorney, Agent, or Firm* — James W. Judge

(57) ABSTRACT

An image forming system includes a job execution unit and a log-image generating unit. The job execution unit is configured to execute a job. The log-image generating unit configured to generate a log image in the job. The log-image generating unit is configured to partially generate as the log image an image of a page output by the job execution unit among pages in the job.

6 Claims, 7 Drawing Sheets

| Job ID | Department ID | User ID | Job Type | Color or Black and White | Number of Input Pages | Number of Output Pages | Aggregate | Duplex | Result |
|---|---|---|---|---|---|---|---|---|---|
| 1 | General Affairs Section 1 | Y0001 | Printing | Color | 10 | 5 | 2 in 1 | Yes | OK |
| 2 | General Affairs Section 1 | J0212 | Copying | Black and White | 5 | 1 | 4 in 1 | No | NG |
| 3 | General Affairs Section 2 | P9302 | Printing | Black and White | 3 | 3 | None | No | OK |
| ... | ... | ... | ... | ... | ... | ... | ... | ... | ... |

| ... | Stamp | Stamp Detail | Overlay | Overlay Detail | Log Image |
|---|---|---|---|---|---|
| ... | Executed | User Name/Date | Not Executed | — | ./ImageLog001.pdf |
| ... | Not Executed | — | Executed | Format 1 | ./ImageLog002.pdf |
| ... | Not Executed | — | Not Executed | — | ./ImageLog003.pdf |
| ... | ... | ... | ... | ... | ... |

27c

| Job Type | Generation Page | Reflection of Output Page |
|---|---|---|
| Printing | All Pages | O F F |
| Copying | Proportion of 1/2 (on Head Side) | O N |

IMAGE FORMING SYSTEM FOR PARTIALLY GENERATING IMAGES AS LOG IMAGE

CROSS-REFERENCE TO RELATED APPLICATION

This application is based upon, and claims the benefit of priority from, corresponding Japanese Patent Application No. 2013-111394 filed in the Japan Patent Office on May 27, 2013, the entire contents of which are incorporated herein by reference.

BACKGROUND

Unless otherwise indicated herein, the description in this section is not prior art to the claims in this application and is not admitted to be prior art by inclusion in this section.

A typical image forming system generates log images of jobs of an image forming apparatus.

SUMMARY

An image forming system according to an embodiment of the present disclosure includes a job execution unit and a log-image generating unit. The job execution unit is configured to execute a job. The log-image generating unit configured to generate a log image in the job. The log-image generating unit is configured to partially generate an image of a page output by the job execution unit among pages in the job, as the log image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 illustrates an example of a job-log database according to the embodiment;

DETAILED DESCRIPTION

Figure 1:
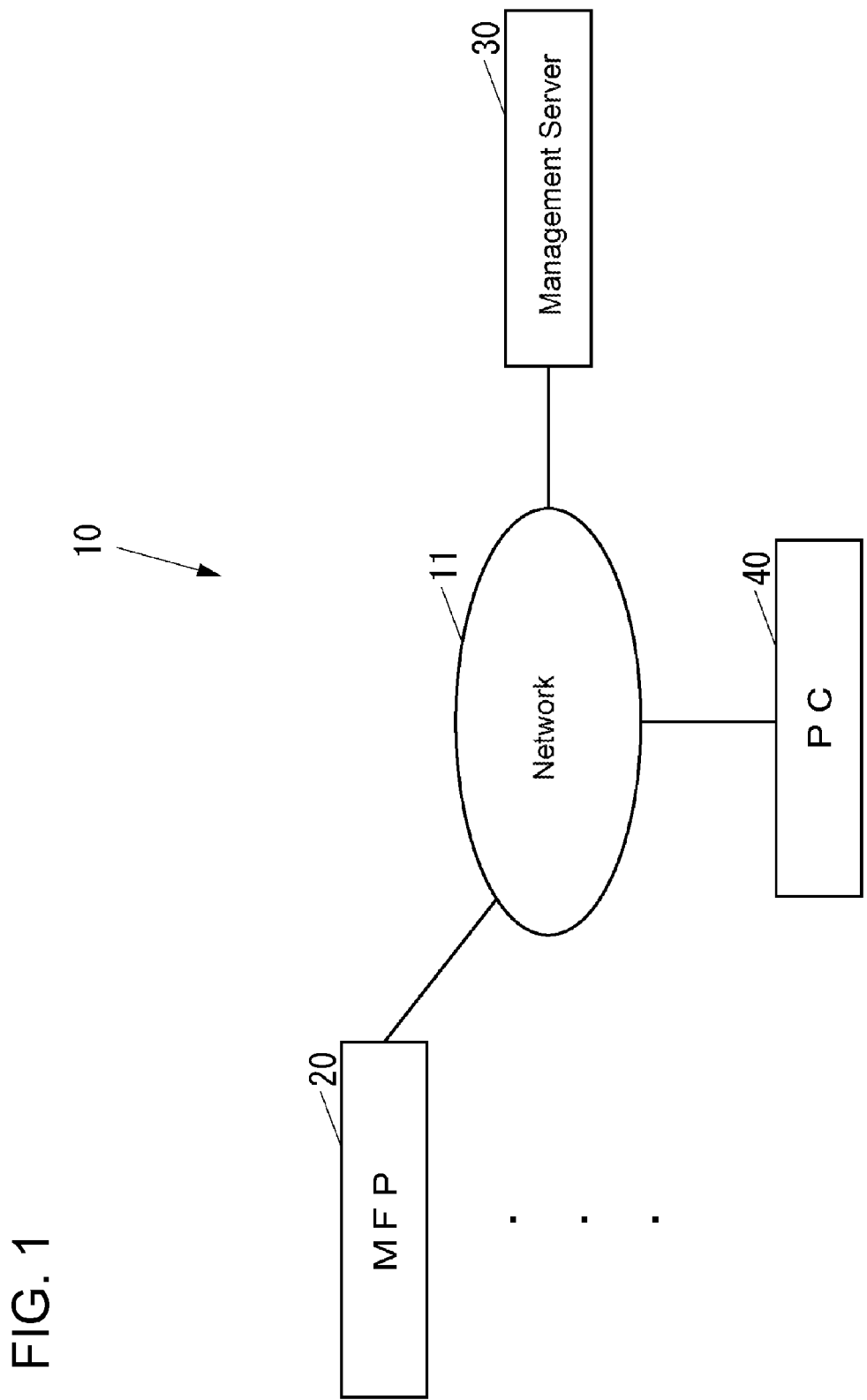
FIG. 1 illustrates a configuration of an image forming system according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings. Firstly, a description will be given of a configuration of an image forming system 10 according to this embodiment.

FIG. 1 illustrates a configuration of the image forming system 10 according to the embodiment. As illustrated in FIG. 1, the image forming system 10 includes a plurality of multifunction peripherals (MFPs) including an MFP 20 as an image forming apparatus, a management server 30 that is a computer for managing the plurality of MFPs including the MFP 20, and a personal computer (PC) 40 that can transmit print data to the plurality of MFPs including the MFP 20. The plurality of MFPs including the MFP 20 and the management server 30 are connected in a communicable manner with each other via a network 11 such as a local area network (LAN) and the Internet. Similarly, the plurality of MFPs including the MFP 20 and the PC 40 are connected in a communicable manner with each other via the network 11.

Each configuration of the plurality of MFPs included in the image forming system 10 is similar to the configuration of the MFP 20. Therefore, a description will be given of the MFP 20 below as a representative of the plurality of MFPs included in the image forming system 10.

Figure 2:
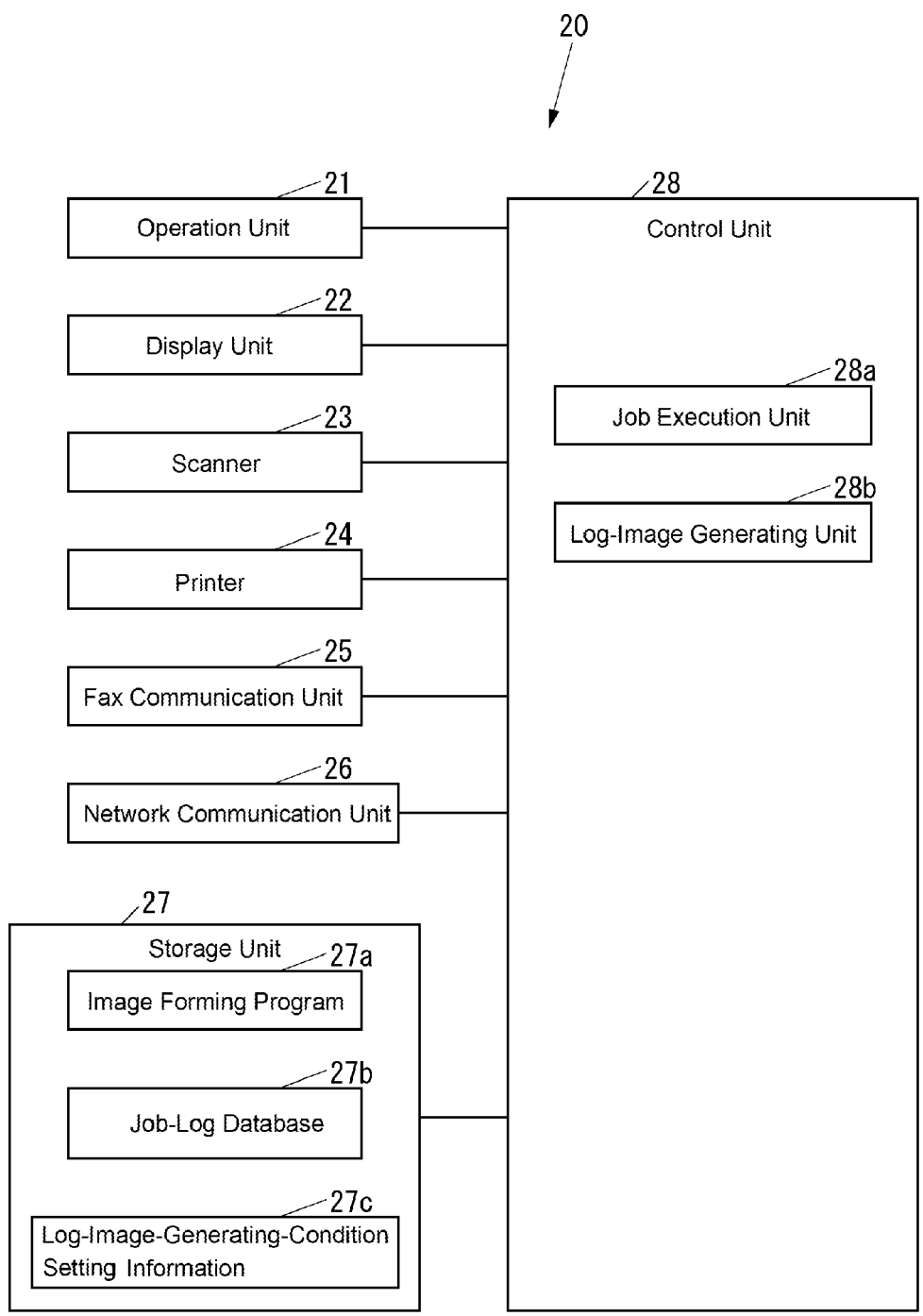
FIG. 2 illustrates a configuration of an MFP according to the embodiment.

FIG. 2 illustrates a configuration of the MFP 20. As illustrated in FIG. 2, the MFP 20 includes an operation unit 21, a display unit 22, a scanner 23, a printer 24, a fax communication unit 25, a network communication unit 26, a storage unit 27, and a control unit 28. The operation unit 21 is an input device such as a button for inputting various operations by a user. The display unit 22 is a device such as a liquid crystal display (LCD) that displays various types of information. The scanner 23 is a reading device that reads an image from an original document. The printer 24 is a device that executes a print job on a recording medium such as a paper sheet. The fax communication unit 25 is a device that performs fax communication with an external facsimile device (not illustrated) via a communication line such as a dial-up line. The network communication unit 26 is a device that communicates with an external device via the network 11 (see FIG. 1). The storage unit 27 is a non-volatile memory such as an electrically erasable programmable read only memory (EEPROM) and a hard disk drive (HDD) that stores various data. The control unit 28 controls the entire MFP 20.

The operation unit 21 may include an input device that forms a touch panel together with the display unit 22.

The storage unit 27 stores an image forming program 27a for forming an image. The image forming program 27a may be installed on the MFP 20 at production stage of the MFP 20, may additionally be installed on the MFP 20 from a storage medium such as a universal serial bus (USB) memory and an SD card, or may additionally be installed on the MFP 20 from the network 11.

The storage unit 27 can store a job-log database 27b that stores a job log indicative of the history of a job by the MFP 20.

FIG. 3 illustrates an example of the job-log database 27b. In the job-log database 27b illustrated in FIG. 3, a plurality of the job logs are illustrated in respective rows. The job log includes various information related to the job, for example, "job ID," "department ID," "user ID," "job type," "color or black and white," "number of input pages," "number of output pages," "aggregate," "duplex," "result," "stamp," "stamp detail," "overlay," "overlay detail," and "log image."

The "job ID" is identification information of the job. The "department ID" is identification information of the department to which the user who has executed the job belongs. The "user ID" is identification information of the user who has executed the job. The "job type" is information indicative of the type of job, for example, "printing" where the printer 24 (see FIG. 2) prints the image (hereinafter referred to as a "received image") received from outside of the MFP 20 via the network communication unit 26 (see FIG. 2), "copying" where the printer 24 prints the image (hereinafter referred to as a "read image") read from the original document by the scanner 23 (see FIG. 2), and similar job. The "color or black and white" is information that indicates whether the job is a job for color print or a job for black-and-white print.

The "number of input pages" is information that indicates the number of pages of the input page contained in the job. The "number of output pages" is information indicative of the number of pages of the output page printed on a recording medium. Here, the output page is counted every paper surface of the recording medium. For example, when the duplex printing is executed on one recording medium, the output page is set to be the page on the frontside surface and the page on the backside surface and the number of output pages is set to be two pages in total. The "aggregate" is information indicative of the number of pages of the input page included in one output page. The "aggregate" includes, for example, "none" where one output page includes one input page, "two in one" where one output page includes two input pages, and "four in one" where one output page includes four input pages. The "duplex" takes values indicative of any of "Yes" indicative of duplex printing and "No" indicative of not duplex printing. The "duplex" is information indicating that the job is a duplex printing job or a one-side printing job. The "result" takes values indicative of any of "OK" indicative of the termination of the execution of the job to the end and "NG" indicative of the termination of the execution of the job in its course. The "result" is information indicating whether or not the job is terminated without any trouble.

The "stamp" takes values indicative of any of "executed" indicative of the execution of a bates stamp and "not executed" indicative of the non-execution of the bates stamp. The bates stamp is a stamp where any information such as a user name and a date is superimposed on the image of the print target to be printed. The "stamp" is information indicating whether or not the bates stamp is executed. The "stamp detail" is information indicating the information superimposed on the image of the print target as the bates stamp. The "overlay" takes values indicative of any of "executed" indicative of the execution of the overlay and "not executed" indicative of the non-execution of the overlay. The overlay means that a specific image is superimposed on the image of the print target to be printed. The "overlay" is information indicative of whether or not the overlay is executed. The "overlay detail" is information indicative of the content of the image superimposed on the image of the print target as overlay. The "overlay detail" is information indicative of the link to the image superimposed on the image of the print target.

The "log image" is information indicative of the link to the log image. The log image is indicative of the history of the image printed in the job. Accordingly, the job log substantially contains the log image. Here, the log image itself is stored in the storage unit 27 (see FIG. 2).

As illustrated in FIG. 2, the storage unit 27 can store log-image-generating-condition setting information 27c that stores the setting of a condition for generating the log image.

Figure 4:
FIG. 4 illustrates an example of log-image-generating-condition setting information according to the embodiment.

FIG. 4 illustrates an example of the log-image-generating-condition setting information 27c. The log-image-generating-condition setting information 27c illustrated in FIG. 4 is the information associated with "job type," "pages to be generated," and "reflection of output page." The "pages to be generated" is information indicative of the setting of pages to be generated as the log image. The "reflection of output page" is information indicative of the setting that indicates whether or not the log image is generated using the information of the "number of output pages" of the job-log database 27b.

The "pages to be generated" can take values indicative of any of "all pages" indicative of generation of a log image of all pages, "any page" indicative of generation of a log image of any specified page, and "proportion" indicative of generation of a log image of pages in a specified proportion of all pages.

In case of the "any page," the specific page can be specified, for example, via the operation unit 21.

In case of the "proportion," a specific proportion such as "½" and "⅓" can be specified via the operation unit 21 or similar unit. Further, in case of the "½," for example, any of "head side," "1, 3, 5, 7 . . . ," and "2, 4, 6, 8 . . . " can be specified. The "head side" indicates pages corresponding to half of all pages on the head side. The "1, 3, 5, 7 . . . " indicates pages every two pages from the first page of all pages, that is, pages with odd numbers. The "2, 4, 6, 8 . . . " indicates pages every two pages from the second page of all pages, that is, pages with even numbers. In case of the "⅓," for example, any of "head side," "1, 4, 7, 10 . . . ," "2, 5, 8, 11 . . . ," and "3, 6, 9, 12 . . . " can be specified. The "head side" indicates pages corresponding to one third of all pages on the head side. The "1, 4, 7, 10 . . . " indicates pages every three pages from the first page of all pages. The "2, 5, 8, 11 . . . " indicates pages every three pages from the second page of all pages. The "3, 6, 9, 12 . . . " indicates pages every three pages from the third page of all pages.

Here, the process for a case where the fraction occurs when the "head side" is specified can be set, for example, via the operation unit 21. For example, when the "proportion of ½ (on the head side)" is specified and the pages as the target are five pages, it can be set whether the log image of the pages from the first page to the second page is generated or the log image of the pages from the first page to the third page is generated.

The "reflection of the output page" of the log-image-generating-condition setting information 27c takes values indicative of any of "ON" indicative of generation of the log image using the information of the "number of output pages" in the job-log database 27b and "OFF" indicative of generation of the log image without using the information of the "number of output pages" in the job-log database 27b.

Here, the log-image-generating-condition setting information 27c can be changed, for example, via the operation unit 21.

The control unit 28 illustrated in FIG. 2 includes, for example, a central processing unit (CPU), a read only memory (ROM) that stores a program and various data, and a random access memory (RAM) that is used for a work area of the CPU. The CPU executes a program stored in the ROM or the storage unit 27.

The control unit 28 functions as a job execution unit 28a and a log-image generating unit 28b. The job execution unit 28a executes the image forming program 27a stored in the storage unit 27 to execute the job. The log-image generating unit 28b executes the image forming program 27a stored in the storage unit 27 to generate the log image of the job.

Next, a description will be given of the operation of the image forming system 10. Firstly, a description will be given of the operation of the MFP 20 when the job is executed.

Figure 5:
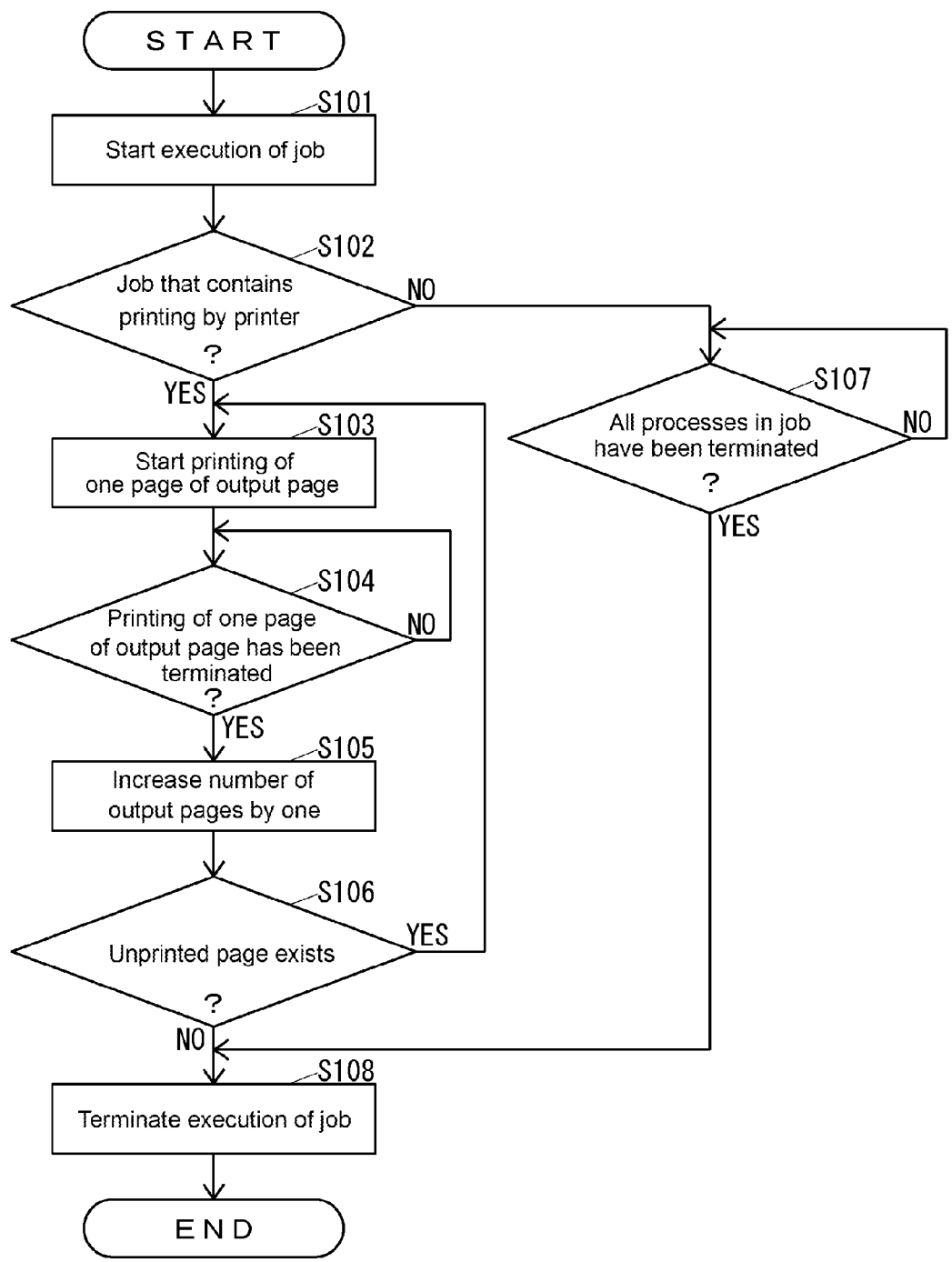
FIG. 5 illustrates an operation of the MFP according to the embodiment when executing a job.

FIG. 5 illustrates an operation of the MFP 20 when executing the job. As illustrated in FIG. 5, the job execution unit 28a of the control unit 28 of the MFP 20 starts executing the job in response to the instruction via the operation unit 21 or the instruction from the PC 40 via the network communication unit 26 (in S101).

Here, the instructions via the operation unit 21 include the instruction of the job for printing the read image or the image stored in the storage unit 27 (hereinafter referred to as a "stored image") by the printer 24, the instruction of the job for transmitting the read image or the stored image via the fax communication unit 25, the instruction of the job for transmitting the read image or the stored image via the network communication unit 26, the instruction of the job for storing the read image in the storage unit 27, or similar instruction.

Here, for example, the stored images include the image previously read from the original document by the scanner 23, the image previously received via the network communication unit 26, or similar image.

The instructions from the PC 40 via the network communication unit 26 include the instruction of the job for printing the received image by the printer 24, the instruction of the job for transmitting the received image via the fax communication unit 25, the instruction of the job for transmitting the received image via the network communication unit 26, the instruction of the job for storing the read image in the storage unit 27, or similar instruction.

Here, when the job where the printer 24 prints the read image or the received image is executed, the job execution unit 28a stores these images in the storage unit 27 before starting the execution of the job. That is, the image that is the print target of the job is always stored in the storage unit 27.

When the execution of the job is started in S101, the job execution unit 28a writes various information such as the "job ID," the "department ID," the "user ID," the "job type," the "color or black and white," the "number of input pages," the "aggregate," the "duplex," the "stamp," the "stamp detail," the "overlay," and the "overlay detail" into the job-log database 27b regarding the job whose execution is started in S101.

After the process in S101, the job execution unit 28a determines whether or not the job whose execution is started in S101 is a job that contains printing by the printer 24 (in S102).

If the job execution unit 28a determines the job as a job that contains printing by the printer 24 in S102, the job execution unit 28a starts printing one page of the output page (in S103) and repeats determining whether or not the printer 24 completes the printing of one page of the output page until the job execution unit 28a determines that the printer 24 has completed the printing of one page of the output page (in S104).

If the job execution unit 28a determines that the printer 24 has completed the printing of one page of the output page in S104, the job execution unit 28a increments the value of the "number of output pages" by one in the job-log database 27b regarding the job whose execution is started in S101 (in S105).

Subsequently, the job execution unit 28a determines whether or not an unprinted page exists in the job whose execution is started in S101 (in S106).

If the job execution unit 28a determines that the unprinted page exists in S106, the job execution unit 28a executes the process in S103 again.

If the job execution unit 28a determines that the job is not a job that contains printing by the printer 24 in S102, the job execution unit 28a repeats determining whether or not all processes in the job are completed until the job execution unit 28a determines all the processes in the job have been completed (in S107).

If the job execution unit 28a determines that the unprinted page does not exist in S106 or determines that all the processes in the job are completed in S107, the job execution unit 28a terminates the execution of the job (in S108).

When the job execution unit 28a terminates the execution of the job in S108, the job execution unit 28a writes the value indicative of "OK" to the "result" in the job-log database 27b regarding the job whose execution is terminated in S108.

After the process in S108, the job execution unit 28a terminates the operation illustrated in FIG. 5.

When the execution of the job is terminated in its course without passing through the process in S108 due to an error, cancellation, or similar cause, the job execution unit 28a writes the value indicative of "NG" to the "result" in the job-log database 27b regarding the job that is terminated in its course.

Next, a description will be given of the operation of the MFP 20 when generating a log image.

Figure 6:
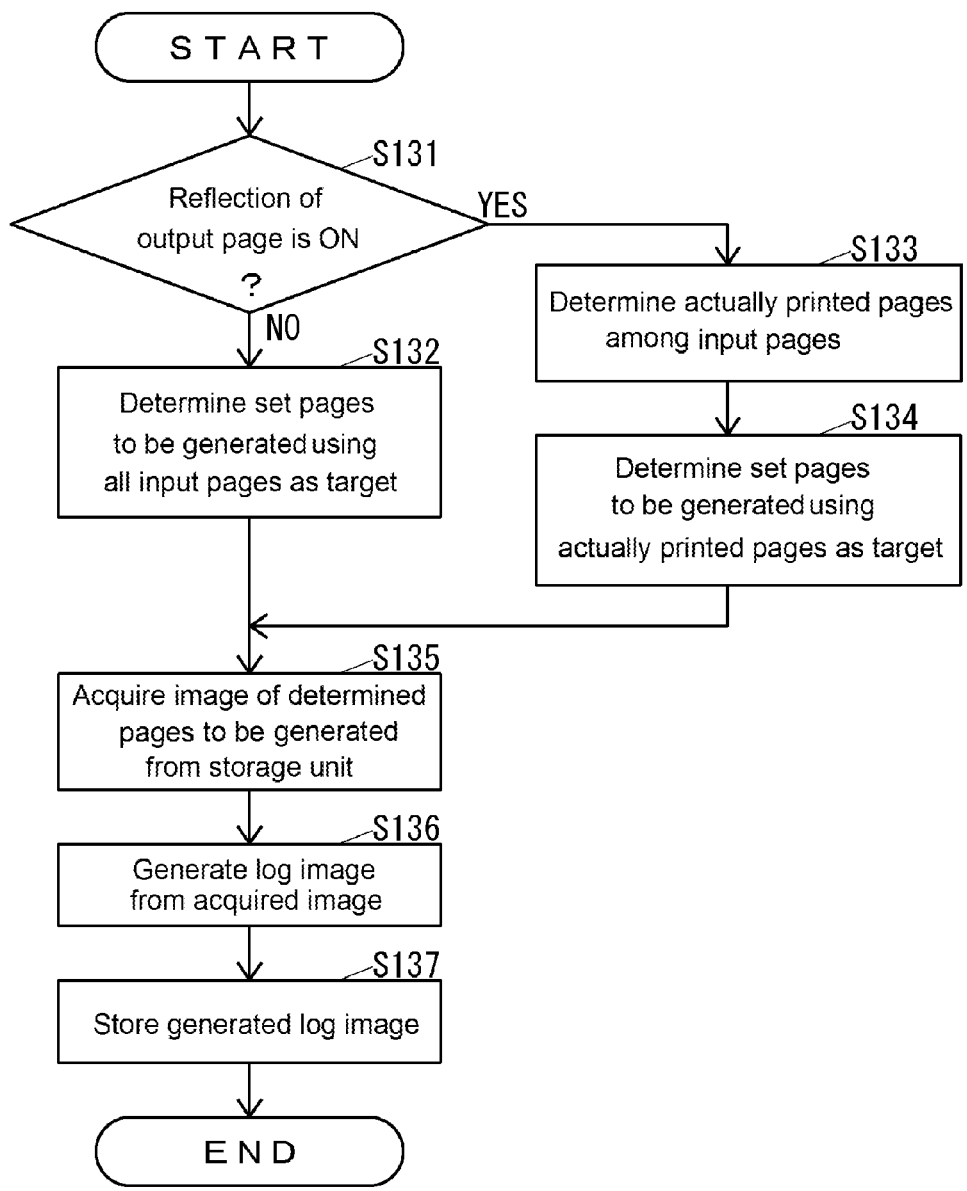
FIG. 6 illustrates an operation of the MFP according to the embodiment when generating a log image of a job that contains printing by a printer.

After the operation illustrated in FIG. 5 is terminated, when the job as the target of the operation is a job that contains printing by the printer 24, the control unit 28 executes the operation illustrated in FIG. 6 regarding this job.

FIG. 6 illustrates an operation of the MFP 20 when generating the log image of the job that contains printing by the printer 24.

As illustrated in FIG. 6, the log-image generating unit 28b of the control unit 28 determines whether or not the value of the "reflection of output page" of the log-image-generating-condition setting information 27c indicates a value of "ON" (in S131). For example, since the job with the "job ID" of "1" or "3" in the job-log database 27b illustrated in FIG. 3 has the "job type" of "printing," the value of the "reflection of output page" indicates "OFF" associated with the "job type" of "printing" in the log-image-generating-condition setting information 27c illustrated in FIG. 4. In the job-log database 27b illustrated in FIG. 3, since the job with the "job ID" of "2" has the "job type" of "copying," the value of the "reflection of output page" indicates "ON" associated with the "job type" of "copying" in the log-image-generating-condition setting information 27c illustrated in FIG. 4.

If the log-image generating unit 28b determines that the value of the "reflection of output page" is not "ON" in S131, the log-image generating unit 28b sets all the input pages as the target and determines the set pages to be generated (in S132).

For example, when the log-image generating unit 28b determines that the set pages to be generated using all the input pages of the job that has the "number of input pages" of "100" in the job-log database 27b as the target and when the value of the "pages to be generated" of the log-image-generating-condition setting information 27c indicates "all pages," the log-image generating unit 28b determines the pages from page one to page 100 as the pages to be generated.

In similar case, that is, when the log-image generating unit 28b determines the set pages to be generated using all the input pages of the job that has the "number of input pages" of "100" in the job-log database 27b as the target and when the value of the "pages to be generated" of the log-image-generating-condition setting information 27c indicates "any page,"

the log-image generating unit 28b determines any specified page in the pages from the first page to page 100 as the pages to be generated.

In similar case, that is, when the log-image generating unit 28b determines the set pages to be generated using all the input pages of the job that has the "number of input pages" of "100" in the job-log database 27b as the target and when the value of the "pages to be generated" of the log-image-generating-condition setting information 27c indicates "proportion of ½ (on the head side)," the log-image generating unit 28b determines pages corresponding to half of the pages from the first page to page 100 on the head side, that is, the pages from the first page to page 50 as the pages to be generated.

If the log-image generating unit 28b determines that the value of the "reflection of output page" indicates "ON" in S131, the log-image generating unit 28b determines the actually printed pages among the input pages based on the information of the "number of output pages" and the "aggregate" in the job-log database 27b (in S133).

For example, regarding the job with the "job ID" of "1" in the job-log database 27b illustrated in FIG. 3, the log-image generating unit 28b determines 10 pages, which is the multiplication of 5 pages in the "number of output pages" by 2 corresponding to the "2 in 1" in the "aggregate," as the actually printed pages among the input pages.

Additionally, regarding the job with the "job ID" of "2" in the job-log database 27b illustrated in FIG. 3, the log-image generating unit 28b determines 4 pages, which is the multiplication of 1 page in the "number of output pages" by 4 corresponding to the "4 in 1" in the "aggregate," as the actually printed pages among the input pages.

Additionally, regarding the job with the "job ID" of "3" in the job-log database 27b illustrated in FIG. 3, the log-image generating unit 28b determines 3 pages, which is the multiplication of 3 pages in the "number of output pages" by 1 corresponding to the "none" in the "aggregate," as the actually printed pages among the input pages.

After the process in S133, the log-image generating unit 28b uses the actually printed pages determined in S133 as the target to determine the set pages to be generated (in S134).

For example, when the log-image generating unit 28b determines the set pages to be generated using 50 pages actually printed as the target regarding the job with the "number of input pages" of "100" in the job-log database 27b and when the value of the "pages to be generated" of the log-image-generating-condition setting information 27c indicates "all pages," the log-image generating unit 28b determines the pages from the first page to page 50 as the pages to be generated.

In similar case, that is, when the log-image generating unit 28b determines the set pages to be generated using 50 pages actually printed as the target regarding the job with the "number of input pages" of "100" in the job-log database 27b and when the value of the "pages to be generated" of the log-image-generating-condition setting information 27c indicates "any page," the log-image generating unit 28b determines any specified page in the pages from the first page to page 50 as the pages to be generated.

In similar case, that is, when the log-image generating unit 28b determines the set pages to be generated using 50 pages actually printed as the target regarding the job with the "number of input pages" of "100" in the job-log database 27b and when the value of the "pages to be generated" of the log-image-generating-condition setting information 27c indicates "proportion of ½ (on the head side)," the log-image generating unit 28b determines pages corresponding to half of the pages from the first page to page 50 on the head side, that is, the pages from the first page to page 25 as the pages to be generated.

After the process in S132 or S134, the log-image generating unit 28b acquires the image of the pages to be generated determined in S132 or S134 among the images stored in the storage unit 27 as the print target by the target job (in S135).

Subsequently, the log-image generating unit 28b generates, for example, the log image in the file format such as portable document format (PDF) based on the image acquired in S135 (in S136).

Here, the log-image generating unit 28b leaves the setting of the bates stamp and the overlay in the "stamp," the "stamp detail," the "overlay," the "overlay detail" in the job-log database 27b without synthesizing the bates stamp or the overlay with the log image generated in S136 even when the bates stamp or the overlay is set in the job. Regarding the log image, not synthesizing the bates stamp or the overlay with the log image can improve the visibility when the administrator checks the content and can improve the recognition rate by optical character recognition (OCR) when the character information is extracted by optical character recognition. The administrator can confirm the process executed by the user by checking the "stamp," the "stamp detail," the "overlay," and the "overlay detail" in the job-log database 27b even when the bates stamp or the overlay is synthesized with the log image.

Here, when the bates stamp or the overlay is set in the job, the log-image generating unit 28b may be configured to synthesize the bates stamp or the overlay with the log image generated in S136.

After the process in S136, the log-image generating unit 28b stores the log image generated in S136 into the storage unit 27 (in S137) and then terminates the operation illustrated in FIG. 6. At this time, the log-image generating unit 28b writes the information indicative of the link to this log image in the "log image" of the target job in the job-log database 27b.

Figure 7:
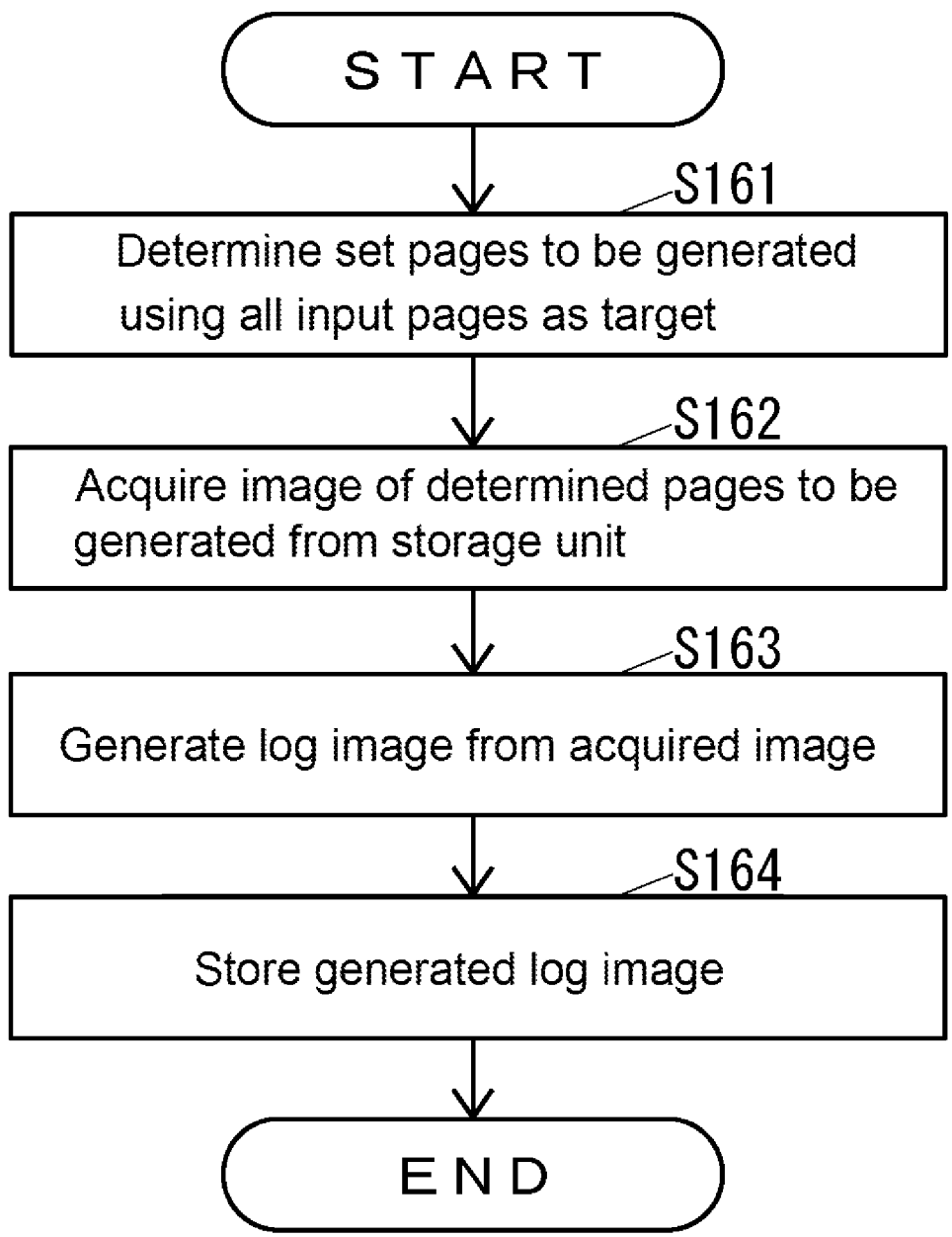
FIG. 7 illustrates an operation of the MFP according to the embodiment when generating a log image of a job that does not contain printing by the printer.

After the operation illustrated in FIG. 5 is terminated, when the job as the target of this operation is a job that does not contain printing by the printer 24, the control unit 28 executes the operation illustrated in FIG. 7 regarding this job.

FIG. 7 is a flowchart of the operation of the MFP 20 when generating the log image of the job that does not contain printing by the printer 24.

As illustrated in FIG. 7, the log-image generating unit 28b of the control unit 28 executes the process from S161 to S164 similarly to the processes in S132, S135, S136 and S137 illustrated in FIG. 6, and then terminates the operation illustrated in FIG. 6.

Here, the control unit 28 may be configured to transmit the job log stored in the job-log database 27b of the storage unit 27 and relevant information such as the log image and the image of the overlay at a specific timing to the management server 30 via the network communication unit 26. When the management server 30 receives the job log and the relevant information, the management server 30 stores the received job log and the information.

When the administrator can check whether or not, for example, there is a user who has illegally output the confidential information to the MFP by checking information such as the job log stored in the MFP or the management server 30, and the log image and the image of the overlay associated with this job log.

Here, as described above, the MFP 20 executes the process related to the "reflection of output page" using the job that contains printing by the printer 24 as the target. This is because the job of "storing" where the read image or the received image is simply stored in the storage unit 27 does not basically cause the problem of leakage of confidential information. This is because the job of "transmitting" where the read image, the received image, or the stored image is simply transmitted via the fax communication unit 25 or the network communication unit 26 does not cause transmission of only a part of the input pages. Accordingly, regarding the job of "storing" or "transmitting," the MFP 20 generates and stores the job log and the log image without execution of the process related to the "reflection of output page." However, the MFP 20 may also execute the process related to the "reflection of output page" on the job of "transmitting" when only a part of the input pages is likely to be transmitted.

As described above, the image forming system 10 can partially generate the image of the actually output pages among the pages in the job as the log image (from S133 to S136). This can improve the reliability of the log image compared with the configuration that generates the image of the pages that are not actually output among the pages in the job as the log image.

The image forming system 10 can partially generate the image of the actually output pages among the pages in the job as the log image (from S133 to S136). This can reduce the number of pages to be generated as a log image compared with the configuration that generates also the image of the pages that are not actually output among the pages in the job as the log image. As a result, this can reduce the time required for generating the log image and the storage capacity required for storing the log image.

Additionally, the image forming system 10 generates the log image after the execution of the job is terminated. This can suppress delay of the execution of the job due to the load of the process for generating the log image.

When "any page" or "proportion" is set to the "pages to be generated" in the log-image-generating-condition setting information 27c regarding the target job, the image forming system 10 partially generates the image of a part of pages among the actually output pages in the job as the log image (from S134 to S136). This can reduce the number of pages to be generated as the log image. As a result, the image forming system 10 can reduce the time required for generating the log image and the storage capacity required for storing the log image.

When "proportion" is set to the "pages to be generated" in the log-image-generating-condition setting information 27c regarding the target job, the image forming system 10 generates the image corresponding to the pages in a specified proportion of the actually output pages in the job as the log image. With this configuration, the image forming system 10 can specify the page to be generated as the log image among the actually output pages in the job by proportion. This can facilitate specifying the page to be generated as the log image among the actually output pages in the job, compared with the configuration that specifically specifies every page to be generated as the log image among the actually output pages in the job.

Here, while in the embodiment the job-log database 27b stores the information of the "aggregate" for each job, the information of the "aggregate" may be stored in units of pages in the job to accurately determine the actually output pages in S133 when the MFP has the configuration that can set aggregation in units of pages. A possible job that can set aggregation in units of pages is, for example, a job where reading the image from the original document by the scanner 23 in the job of copying is repeated a plurality of times for each instruction from the operation unit 21.

While in the embodiment the log-image-generating-condition setting information 27c sets the "pages to be generated" and the "reflection of output page" for each job type, the "pages to be generated" and the "reflection of output page" may be set for each one of the job type, the department ID, and the user ID or for each combination of two or more of the job type, the department ID, and the user ID.

Here, while in this embodiment the log-image generating unit that generates the log image of the job is realized by the MFP, the log-image generating unit may be realized by the management server 30 or may be realized by the collaboration of the MFP and the management server 30.

While in this embodiment the image forming apparatus of the disclosure is the MFP, the image forming apparatus may be an image forming apparatus other than the MFP such as a printer-only machine and a copy-only machine.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   a reading device for capturing image information from original documents;
   a storage unit for storing received image information;
   a printing device for executing print jobs on sheets in accordance with image information from the reading device or from the storage unit; and
   a control processor enabled to function as
   a job execution unit configured to execute jobs by the printing device whereby input pages of a job-specific input sheet count are formed as output pages of an actual output sheet count less than or equal to the input sheet count; and
   a log-image generating unit configured to generate log images of the jobs; wherein the log-image generating unit is configured to
   generate, as a log image, images of a portion of pages among the output pages in a job by the job execution unit, and generate the log image after the job execution unit has terminated execution of the job, the portion of pages being one selected from
   (1) any specifically designated page or pages among the output pages;
   (2) a designated proportion of the actually output pages; or
   (3) output-page mirroring, being a reflection of all actual output pages.

2. The image forming apparatus according to claim 1, wherein:
   the job execution unit judges whether output of a single-page portion of output pages has terminated; and
   the log image generating unit determines the pages that have been output among input pages, following termination of job execution by the job execution unit.

3. An image forming method, comprising:
   executing printing jobs whereby input pages of a job-specific input sheet count are formed as output pages of an actual output sheet count less than or equal to the input sheet count; and
   generating log images of the jobs; wherein the generating includes
   generating, as a log image, images of a portion of pages among the output pages in a job by the job execution unit, and generating the log image after the job execution unit has terminated execution of the job, the portion of pages being one selected from
(1) any specifically designated page or pages among the output pages;
(2) a designated proportion of the actually output pages; or
(3) output-page mirroring, being a reflection of all actual output pages.

4. The image forming method according to claim 3, wherein:
the printing-job executing judges whether output of a single-page portion of output pages has terminated; and
the log image generating determines the pages that have been output among input pages, following termination of job execution by the printing-job executing.

5. A non-transitory computer-readable recording medium storing an image forming program, the image forming program causing an image forming apparatus to function as:
a job execution unit that executes printing jobs whereby input pages of a job-specific input sheet count are formed as output pages of an actual output sheet count less than or equal to the input sheet count; and
a log-image generating unit that generates log images of the jobs; wherein the log-image generating unit
generates, as a log image, images of a portion of pages among the output pages in a job by the job execution unit, and generates the log image after the job execution unit has terminated execution of the job, the portion of pages being one selected from
(1) any specifically designated page or pages among the output pages;
(2) a designated proportion of the actually output pages; or
(3) output-page mirroring, being a reflection of all actual output pages.

6. The non-transitory computer-readable recording medium according to claim 5, wherein:
the job execution unit judges whether output of a single-page portion of output pages has terminated; and
the log image generating unit determines the pages that have been output among input pages, following termination of job execution by the job execution unit.

* * * * *